(12) United States Patent
Lee (10) Patent No.: US 7,021,413 B1
(45) Date of Patent: Apr. 4, 2006

(54) FOLDABLE ELECTRIC MOTORCYCLE STRUCTURE

(76) Inventor: Shuei-Yuan Lee, P.O. Box No. 6-57 Junghe, Taipei 235 (TW)

( * ) Notice: Subject to any disclaimer, the term of this patent is extended or adjusted under 35 U.S.C. 154(b) by 0 days.

(21) Appl. No.: 11/094,127

(22) Filed: Mar. 31, 2005

(51) Int. Cl.
*B62D 61/02* (2006.01)
(52) U.S. Cl. ............... 180/181; 180/180; 180/183
(58) Field of Classification Search ............ 180/180, 180/181, 183; 280/87.05
See application file for complete search history.

(56) References Cited

U.S. PATENT DOCUMENTS

| | | | |
|---|---|---|---|
| 6,568,496 B1 * | 5/2003 | Huang | 180/220 |
| 6,609,584 B1 * | 8/2003 | Patmont et al. | 180/220 |
| 6,752,229 B1 * | 6/2004 | Ho | 180/181 |
| 6,830,255 B1 * | 12/2004 | Cheng | 280/87.041 |
| 6,866,275 B1 * | 3/2005 | Puzey | 280/87.05 |

* cited by examiner

*Primary Examiner*—Christopher P. Ellis
*Assistant Examiner*—Cynthia F. Collado (57) ABSTRACT

A foldable electric motorcycle structure includes primarily a body, a front and rear frames, and a cap, wherein the cap is located at a front part of the front frame, a seat is located at a top edge of the rear frame, and latching mechanisms are located respectively at the front and rear frames, such that the front and rear frames can be unfolded into a riding condition, and a shielding effect can be constituted by the cap during riding. Whereas a box is formed for carrying upon folding the front and rear frames, which enables pulling in walk by the means of auxiliary wheels at two sides of the rear frame and a pulling bar at a front edge of the body, thereby causing more convenience in using an electric motorcycle.

5 Claims, 9 Drawing Sheets

FOLDABLE ELECTRIC MOTORCYCLE STRUCTURE

BACKGROUND OF THE INVENTION a) Field of the Invention

The present invention relates to a foldable electric motorcycle structure, and more particularly to an electric motorcycle structure that is easy to operate, lightweight, and convenient to carry.

b) Description of the Prior Art

As an increasingly consumption of energy is reaching a crisis, countries all over the world are eagerly developing transportation tools that can save energy. Among those transportation tools an electric motorcycle without using fuel gains a high attention by research and development organizations. Current electric motorcycles which are successfully developed have a shortcoming of a large size and inconvenience in carrying. Accordingly, the inventor has designed a lightweight and foldable electric motorcycle such that a riding condition and a dragging condition for carrying can be formed with easy operations.

SUMMARY OF THE INVENTION

The primary object of the present invention is to provide an electric motorcycle structure with a more convenient operation, a more compact size and a more inexpensive manufacturing cost comprising a body, a front frame, a rear frame and a cap, wherein a seat is located at a top edge of the rear frame, the cap is mounted on the front frame, and latching mechanisms are mounted on the front and rear frames respectively, such that the entire body can be unfolded into a riding condition with an easy operation, and a shielding effect by the means of cap can be constituted upon riding. In addition, the electric motorcycle is formed into a box upon folding the front and rear frames, so as to constitute a condition similar to dragging a baggage by the means of a pulling bar at a front edge of the body and auxiliary wheels at two sides of the rear frame, thereby facilitating pulling in walk upon carrying in person.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
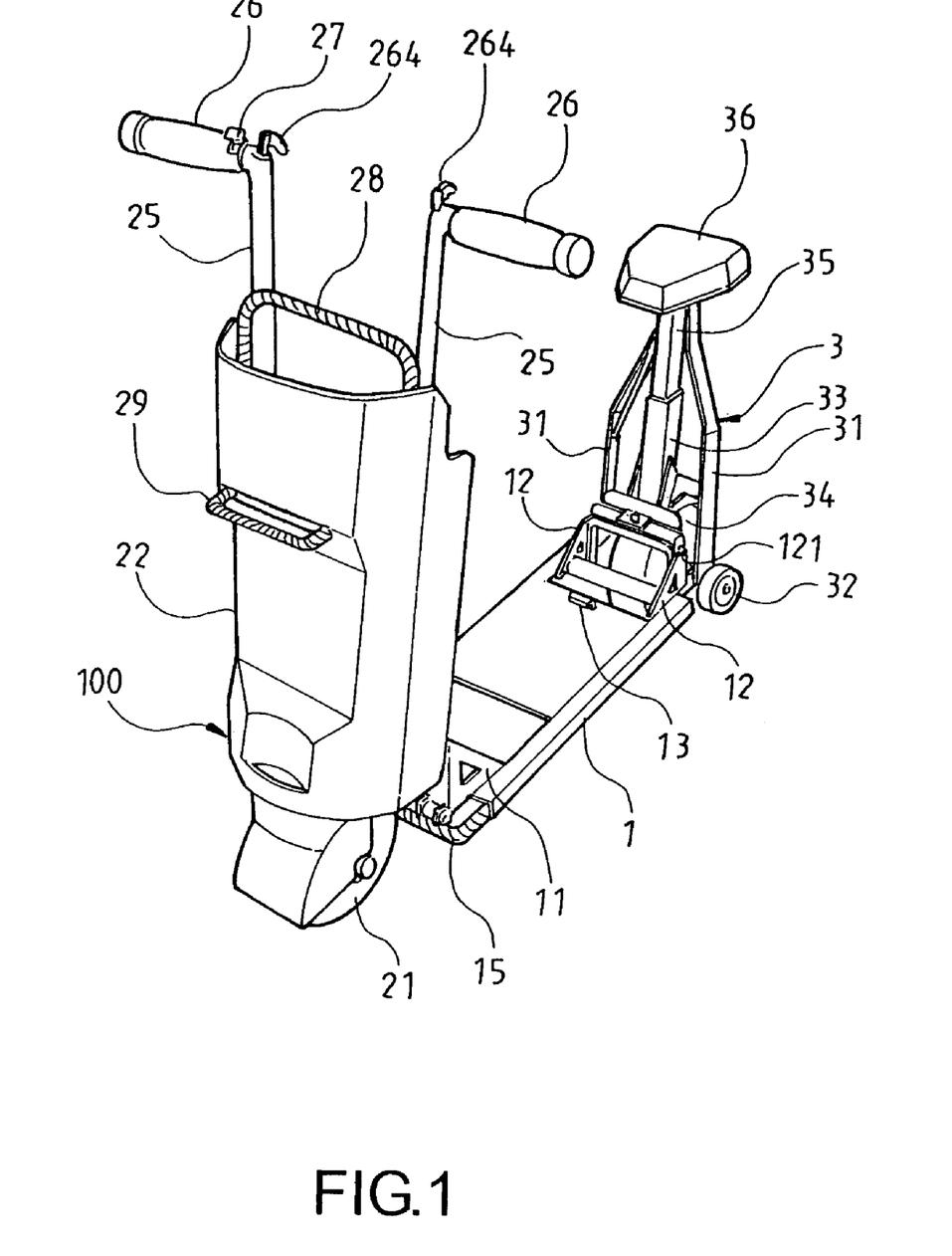
FIG. 1 shows a perspective view of the present invention.
Figure 2:
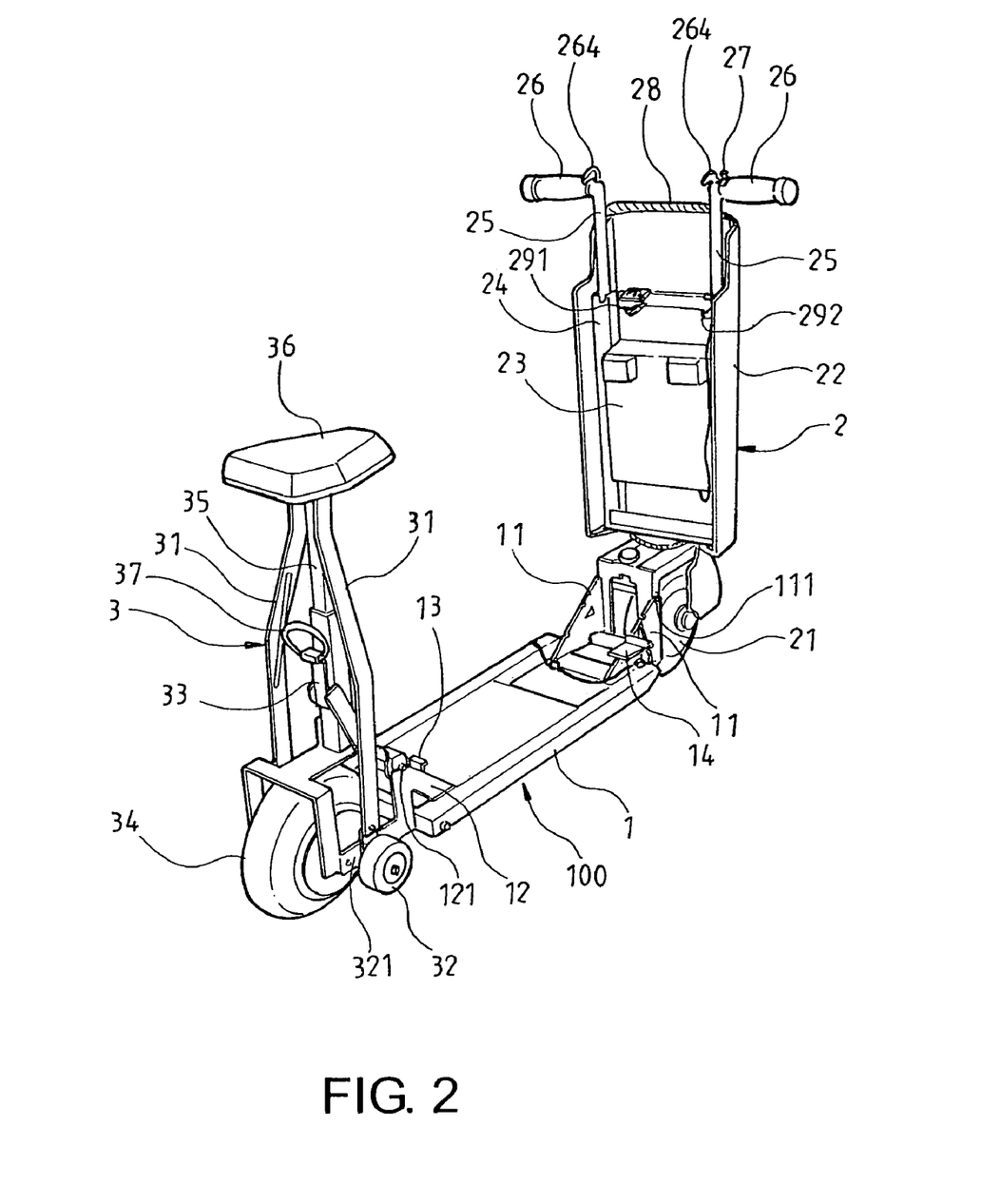
FIG. 2 shows a perspective view at another angle of the present invention.

Referring to FIG. 1 and FIG. 2, the present invention comprises primarily a body 1, a front frame 2 and a rear frame 3, which constitute a bendable condition after connecting the front and rear frames 2, 3 with the body 1, wherein a front and rear fixing pieces 11, 12 are mounted at a front and rear parts of the body 1 respectively, and latching hooks 111, 121 are mounted at the front and rear fixing pieces 11, 12 for latching and fixing the front and rear frames 2, 3. In addition, another latching hook 13 is mounted at a top of a rear edge of the body 1, a brake pedal 14 is mounted on the front fixing piece 11, and a retractable pulling bar 15 is mounted at a front edge of the body 1.

A front wheel 21 is mounted at a bottom end of the front frame 2, a cap 22 is mounted at a front end of the front frame 2, a battery is emplaced at an inner edge of the cap 22, and sleeves 24 are mounted at two sides of the cap 22 respectively for sheathing two retractable rods 25. Two handlebars 26 are mounted at a top of the rods 25, a gas switch 27 connected to the battery 23 is mounted at one of the handlebars 26, and a retractable lifting bar 28 is mounted at a top of the cap 22.

Supporting pieces 31 are mounted at two sides of the rear frame 3 for connecting with a fixing rod 321 of two auxiliary wheels 32. A sleeve 33 is located at a center of the rear frame 3, a rear wheel 34 is mounted at a bottom end of the sleeve 33, and a seat 36 connected by a retractable rod 35 is located at a top of the sleeve 33.

By assembling the aforementioned compartments, a foldable electric motorcycle 100 is constructed such that the front and rear frames 2, 3 are lifted up and the handlebars 26 are pulled up to form into a riding condition for a user to sit on the seat 36, put hands on the handlebars 26 and control the gas switch 27 for riding upon using; whereas when the electric motorcycle 100 is not used, the front and rear frames 2, 3 are pressed downward for folding so as to form into a box facilitating carrying, or the pulling bar 15 is pulled out to form into a condition similar to dragging a baggage, for pulling in walk.

Figure 3:
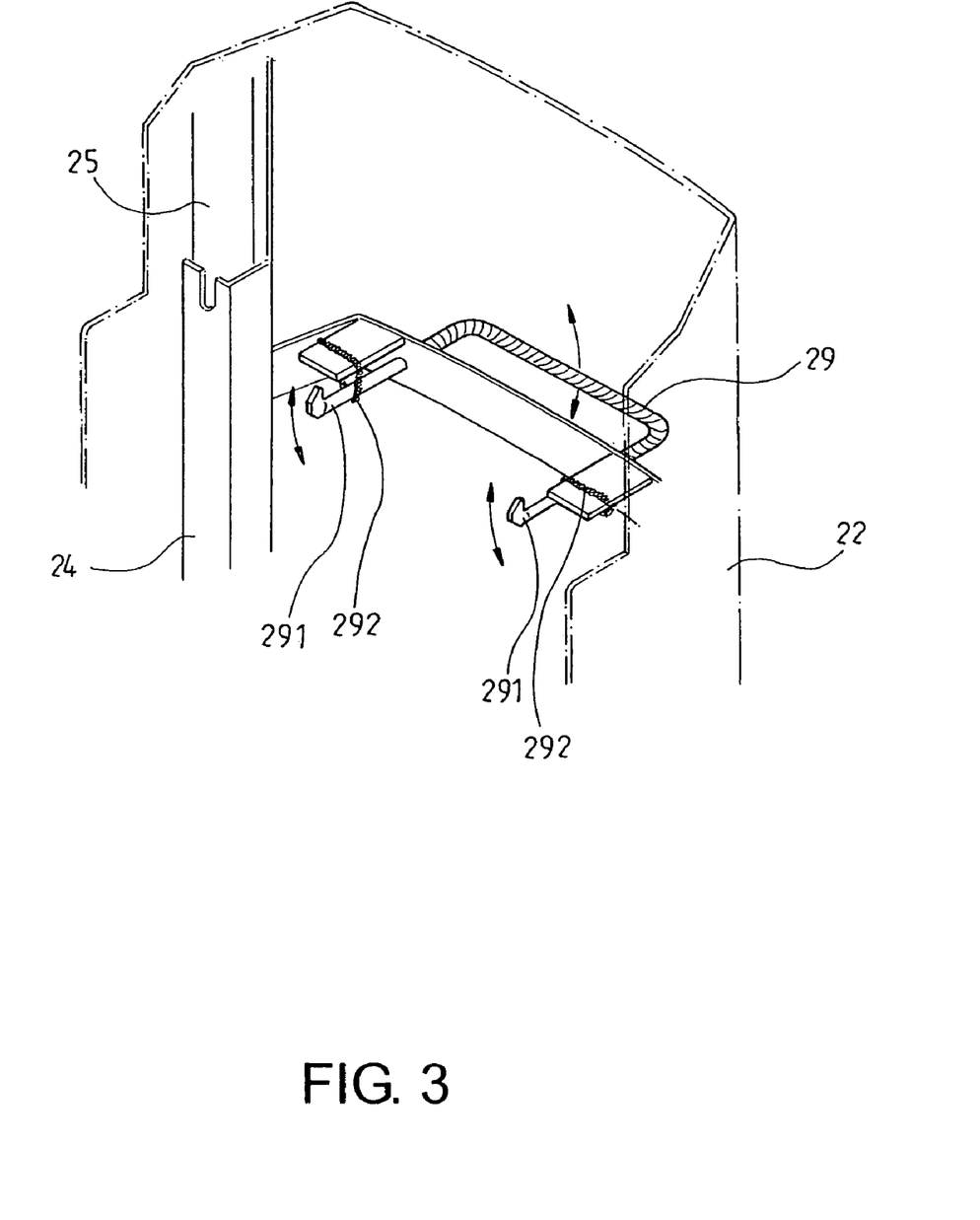
FIG. 3 shows a perspective view of a grip structure of the present invention.

Referring to FIG. 3, a grip 29 used for opening is mounted at the cap 22, and latching hooks 291 which are fixed by elastic elements 292 after being passed through the cap 22, are located at two sides of the grip 22, such that the grip 29 can be lifted for facilitating a latching and fixing after folding, or for opening during unfolding.

Figure 4:
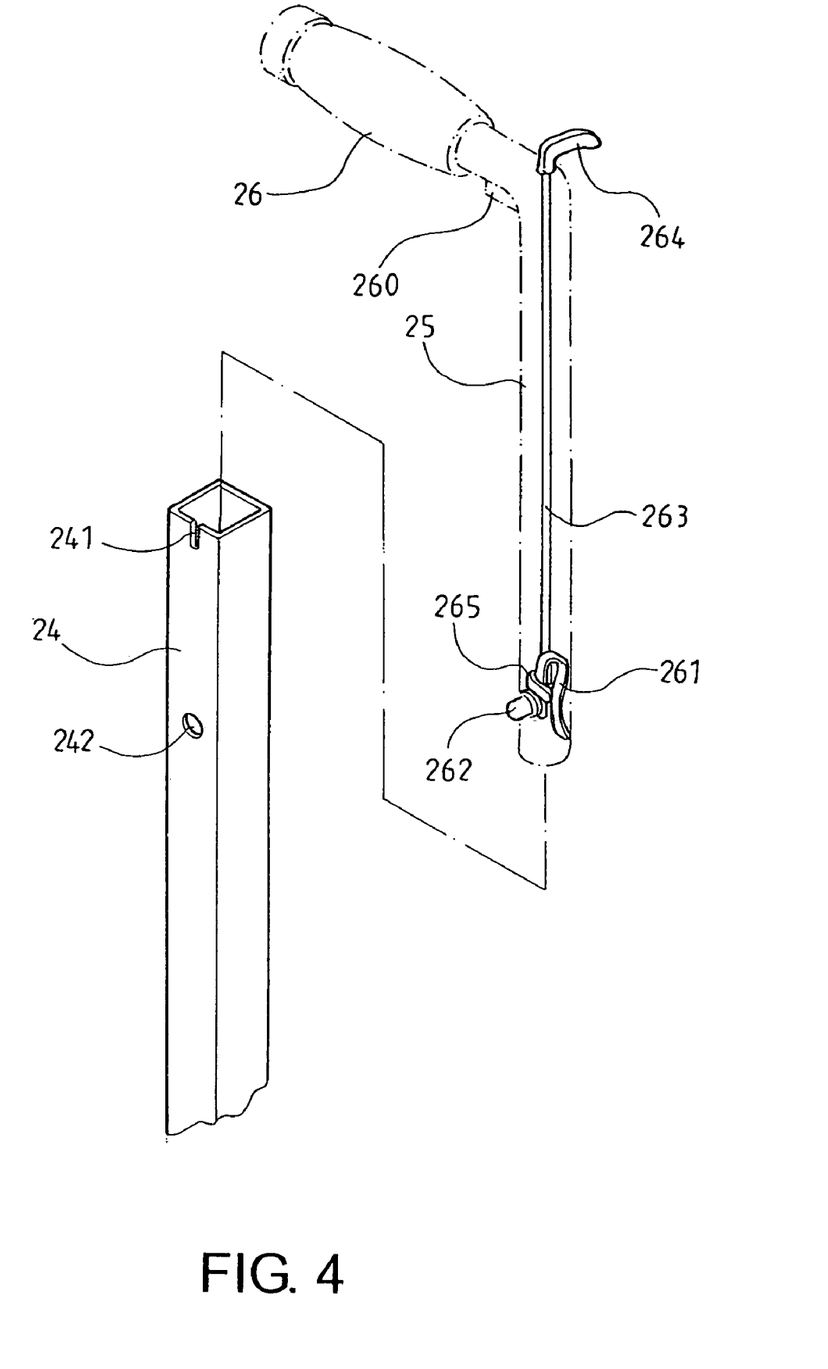
FIG. 4 shows a perspective view of a handlebar structure of the present invention.

Referring to FIG. 4, hollow sleeves 24 are located at two sides of inner edges of the cap 22 respectively, slots 241 are located at edges of openings of the sleeves 24, and positioning holes 242 are located at proper positions of the sleeves 24, so as to sheathe the rods 25 connected to handlebars 26 which have stop pieces 260 at bottom edges into the sleeves 24. Spring leaves 261 are located inside the rods 25, so as to connect the spring leaves 261 to latching pins 262 protruded out of the rods 25, and poke pieces 265 connected to controllers 264 at top ends of the handlebars 26 through connecting rods 263 are located inside the rods 25, so as to constitute a positioning by latching the latching pins 262 into the positioning holes 242 of the sleeves upon pulling up the handlebars 26, and to push aside the spring leaves 261 with the poke pieces 265 by rotating the controllers 262, and to loose the latching pins 262 from the positioning holes 242 upon folding the present invention, thereby retracting the rods 25 into the sleeves 24 and constituting a positioning by latching the stop pieces 260 of the handlebars 26 into the slots 241 of the sleeves 24.

Figure 5:
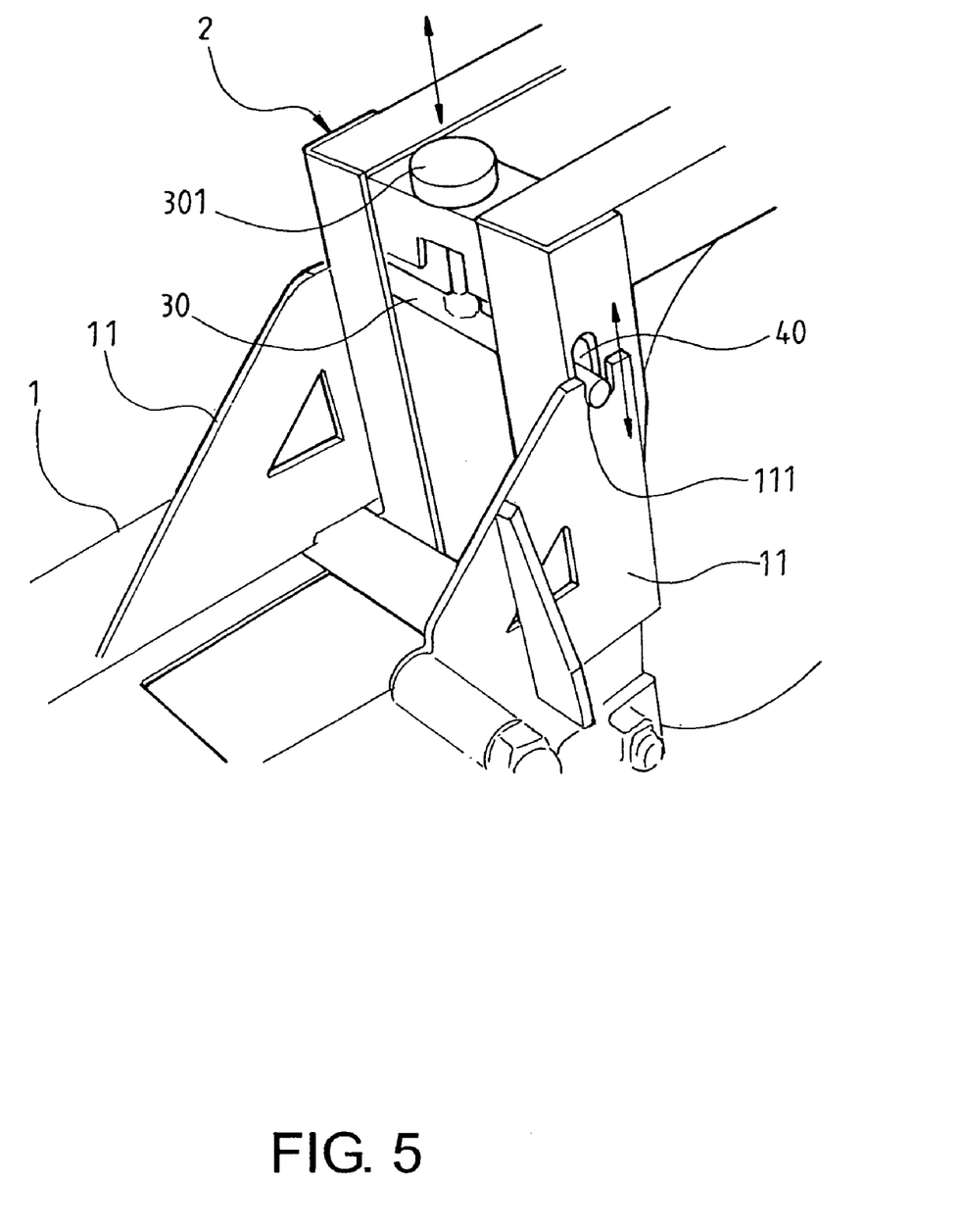
FIG. 5 shows a perspective view of a latching structure of a front frame of the present invention.

Referring to FIG. 5, vertical long holes 40 are located at two sides of bottom edges of the front frame 2, such that two ends of a positioning rod 30 can be passed through the long holes 40, and the positioning rod 30 can be connected to a control knob 301. The positioning rod 30 can be latched into latching slots 111 of the front fixing piece 11 of the body 1 for positioning upon lifting up the front frame 2, whereas the positioning rod 30 is pulled up to loose from the slots 111 by the control knob 301 for facilitating bending down the front frame 2 along a slope of the front fixing piece 11, upon folding the present invention.

Figure 6:
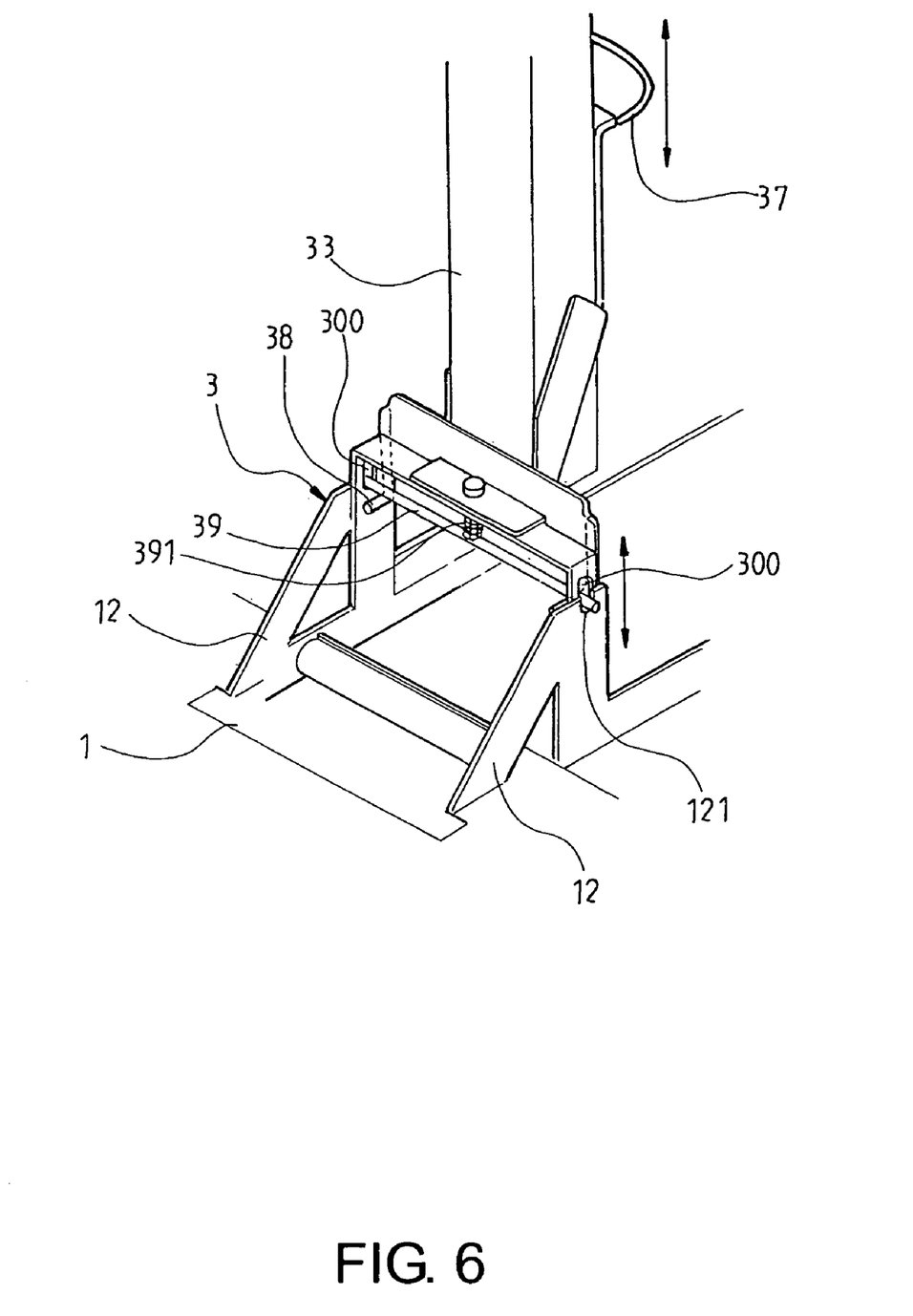
FIG. 6 shows a perspective view of a latching structure of a rear frame of the present invention.

Referring to FIG. 6, a pulling bar 37 is located at a rear edge of the sleeve 33 of the rear frame 3, such that the pulling bar 37 is connected to a positioning rod 39 through a bended rod 38, and two ends of the positioning rod 39 are passed through long holes 300 at two sides of a bottom end of the rear frame 3. In addition, a spring 391 is put against a bottom end of the rear frame 3, such that the positioning rod 39 can be latched into latching slots 121 of the rear fixing piece 12 of the body to constitute a positioning upon lifting up the rear frame 3, whereas the positioning rod 39 is pulled up to loose from the latching slots 121 by the pulling bar 37, so as to facilitate bending down the rear frame 3 along a slope of the fixing piece 12, upon folding the present invention.

Referring to FIG. 1 and FIG. 2, upon using the present invention, the front and rear frames 2, 3 are lifted up to a vertical position respectively, and are latched and fixed in front of and at rear of the body 1. The front wheel 21 and the rear wheel 34 are then unfolded at the front and rear frames 2, 3 and put against a ground, whereas the auxiliary wheels 32 are raised and suspended at two sides of the rear wheel 34. The handlebars 26 are next pulled up to constitute a riding condition, so as to allow a user to sit on the seat 36, put hands on the handlebars 26, and control a driving and speed of the electric motorcycle 100 through the gas switch 27. A braking function is made by the brake pedal 14, and a shielding effect is constituted by the cap 22 during driving.

Figure 7:
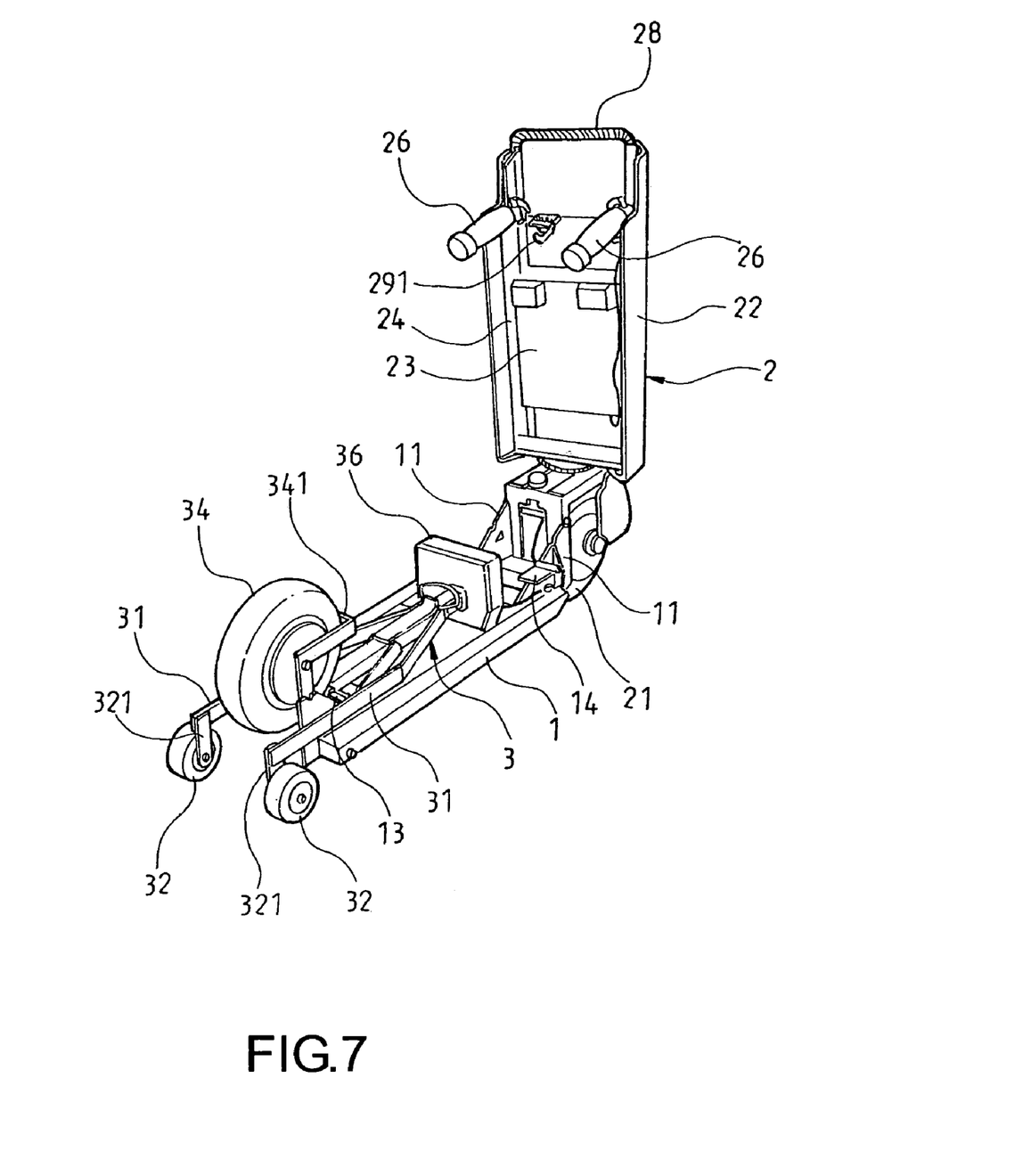
FIG. 7 shows a schematic view of implementing a folding operation of the present invention.
Figure 8:
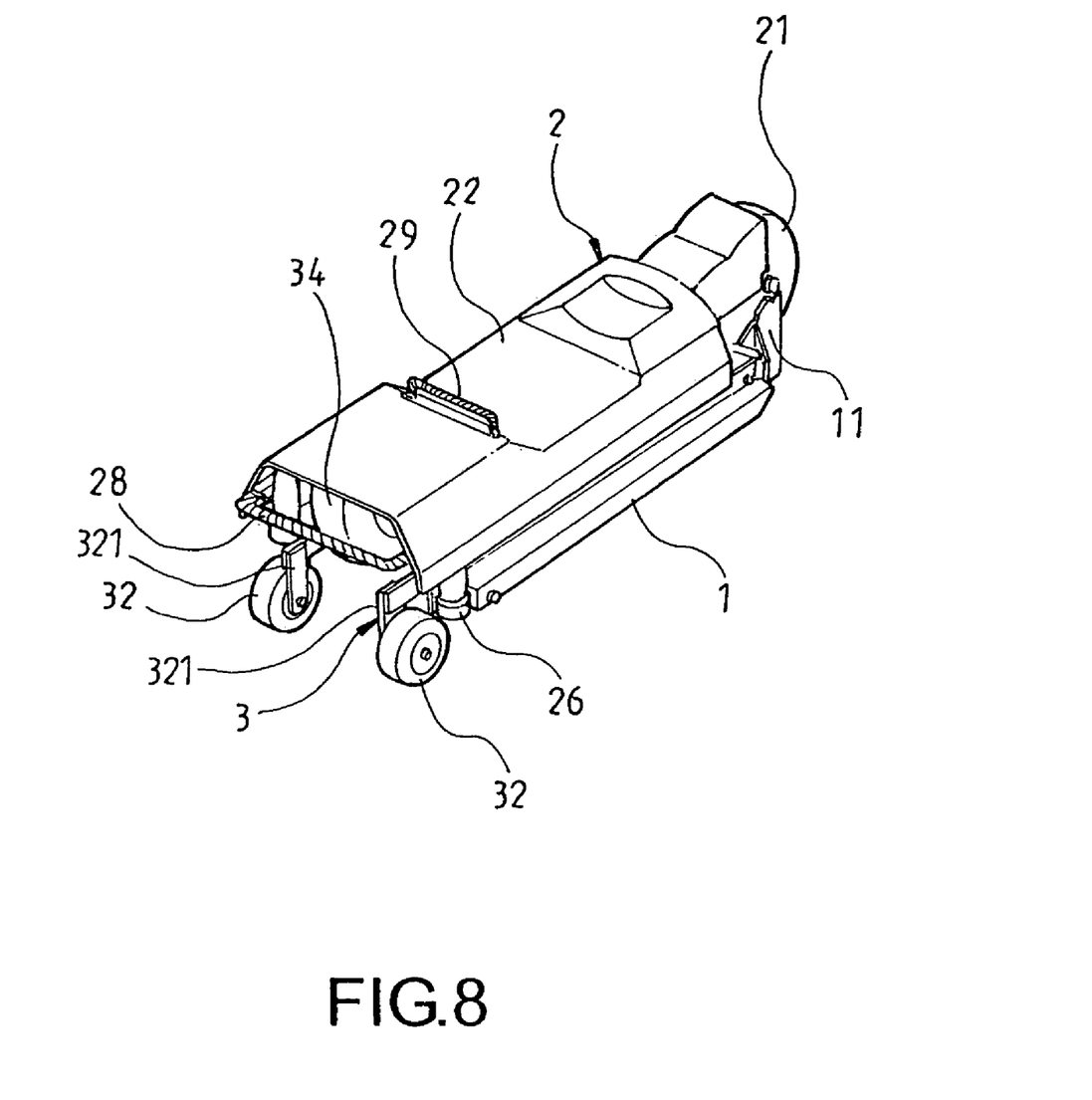
FIG. 8 shows another schematic view of implementing a folding operation of the present invention.
Figure 9:
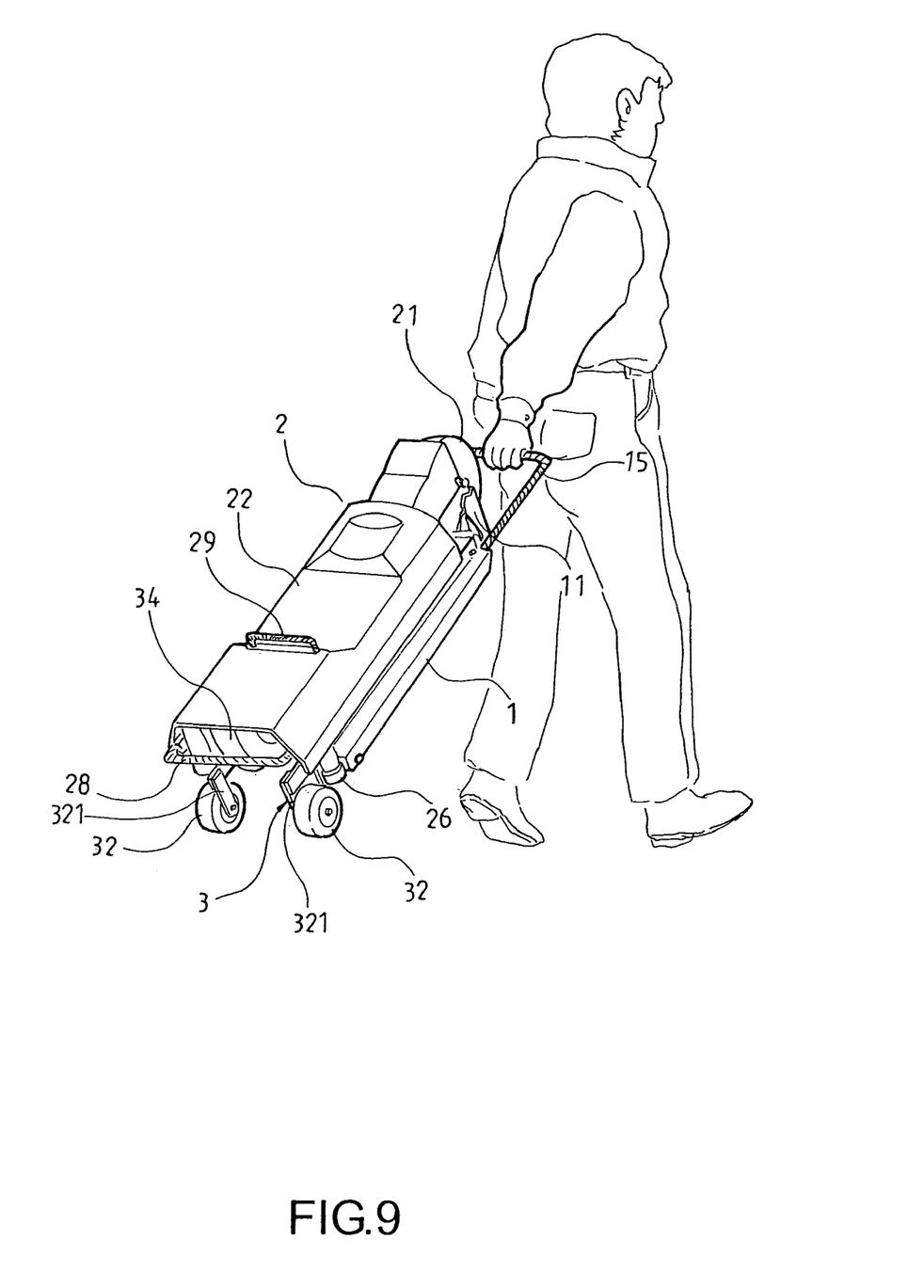
FIG. 9 shows a schematic view of implementing a dragging and carrying of the present invention.

Referring to FIG. 7 and FIG. 8, in folding the present invention, the rear frame 3 is first bended toward the body 1 to be horizontally superimposed on the body 1, and then the rear wheel 34 is raised while the two auxiliary wheels 32 are put against a ground. The rear frame 3 after being bended is latched and fixed into the latching hook 13 by the positioning rod 39. The rear wheel is put at a top of the body 1 by the bending of the rear frame 3, and the front frame 2 is also bended downward after pushing down the handlebars 26, so as to latch the latching hooks 291 of the grip 29 located at the cap 22 onto a supporting bar 341 of the rear wheel 34 for fixing, whereas the front wheel 21 is put at a front top of the body 1 by the bending of the front frame 2. Therefore, the entire electric motorcycle 100 can be folded into a box thereby further reducing a size. As shown in FIG. 9, in addition to facilitate carrying and transporting through the lifting bar 28, the auxiliary wheels 32 can also be rolling along a ground to form into a condition similar to dragging a baggage through a pulling of the pulling bar 15, so as to facilitate carrying and transporting in person. Moreover, when used again, the grip 29 is lifted to loose the latching hooks 291 from the supporting bar 341 of the rear wheel 34, the front frame 2 is lifted up to a upright position, and the pulling bar 37 is pulled to loose the positioning rod 39 from the latching hook 13 of the body 1, and the rear frame 3 is lifted up to a upright position for riding.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A foldable electric motorcycle structure including a body whose front and rear parts are provided with a front and rear fixing pieces having latching slots, whose front edge is provided with a retractable pulling bar, and whose top of a rear edge is provided with a latching hook; a front frame located at a front part of the body and made to be bendable, whose bottom end is provided with a front and whose front edge is provided with a cap having two sleeves with positioning holes at two sides of inner edges thereof for sheathing rods connected with two handlebars into the sleeves, wherein spring leaves are located inside the rods and connected to latching pins protruded out of the rods inside which are located poking pieces of controllers at top of the handlebars connected with a connecting rod for positioning by latching the latching pins into positioning holes of the sleeves upon pulling up the handlebars, and for pushing aside the spring leaves with the poking pieces by rotating the controllers upon folding, further enabling the latching pins to loose from the positioning holes and retracting the rods into the sleeves, and whose two sides of bottom edges are provided with vertical long holes for passing two ends of a positioning rod through the long holes, and for connecting the positioning rod to a control knob, such that the positioning rod can be latched into latching slots of the front fixing piece of the body for positioning upon lifting up the front frame, whereas the positioning rod is pulled up to loose from the latching slots by the control knob for facilitating bending down the front frame; a rear frame located at a rear part of the body and made to be bendable, whose two sides are provided with supporting pieces for connecting with a fixing rod having two auxiliary wheels, whose center is provided with a sleeve having a rear wheel at a bottom end and a retractable rod at a top for connecting to a seat, and whose rear edge is provided with a pulling bar connected to a positioning rod through a bended rod, for passing two ends of the positioning rod through long holes at two sides of a bottom end of the rear frame, and for putting a spring against a bottom end of the rear frame, such that the positioning rod can be latched into latching slots of the rear fixing piece of the body for positioning upon lifting up the rear frame, whereas the positioning rod is pulled up to loose from the latching slots by the pulling bar, so as to facilitate bending down the rear frame; a foldable electric motorcycle constructed by assembling the aforementioned compartments such that the front and rear frames are lifted to a upright position for riding and a shielding effect is induced by the cap during driving, whereas when the front and rear frames are bended downward, the front and rear wheels are at top of the body to form into a box by the movement of the front and rear frames, thereby facilitating transporting or pulling and carrying in person in a condition similar to dragging a baggage.

2. The foldable electric motorcycle structure according to claim 1, wherein a grip used for opening is located at the cap, and latching hooks fixed by elastic elements are located at two sides of the grip, such that the grip can be lifted, enabling the latching hooks to be latched onto a supporting bar of the rear wheel for fixing, upon folding the front frame.

3. The foldable electric motorcycle structure according to claim 1, wherein stop pieces are located at bottom edges of the handlebars, and slots are located at edges of openings of the sleeves, thereby constituting a positioning by latching the stop pieces into the slots when retracting the handlebars into the sleeves.

4. The foldable electric motorcycle structure according to claim 1, wherein a brake pedal is located at the front fixing piece of the body for controlling a driving speed and for performing a brake function.

5. The foldable electric motorcycle structure according to claim 1, wherein a gas switch connected to a battery is located at one of the handlebars for controlling a driving speed.

* * * * *